Oct. 28, 1969

E. K. STRAND 3,474,675

LIQUID SAMPLER

Filed Dec. 5, 1966

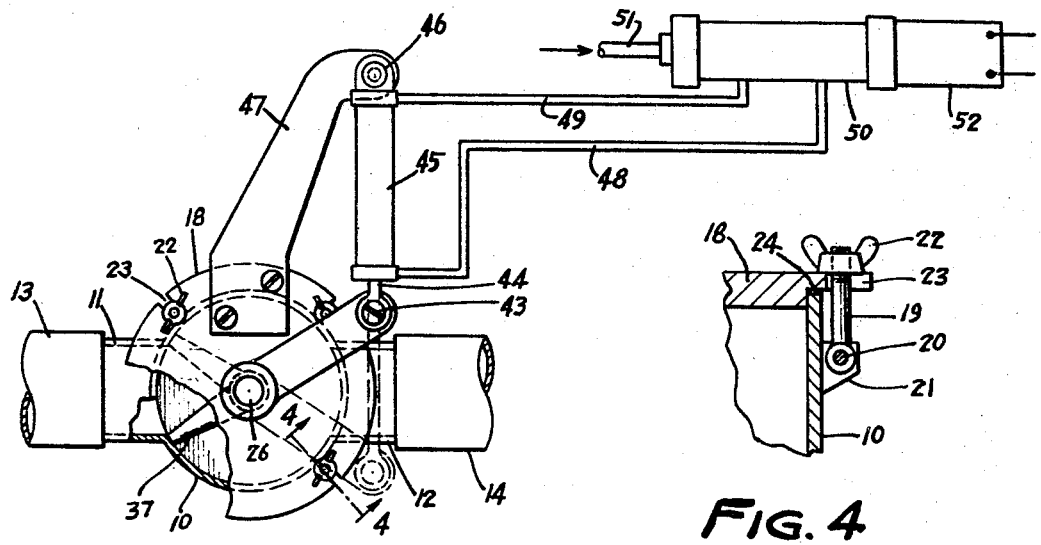
FIG. 3
FIG. 4
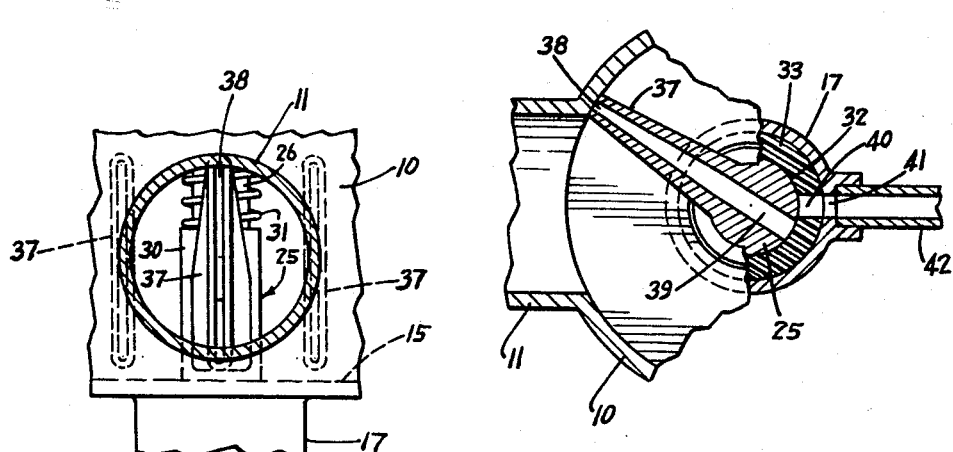
FIG. 5
FIG. 6

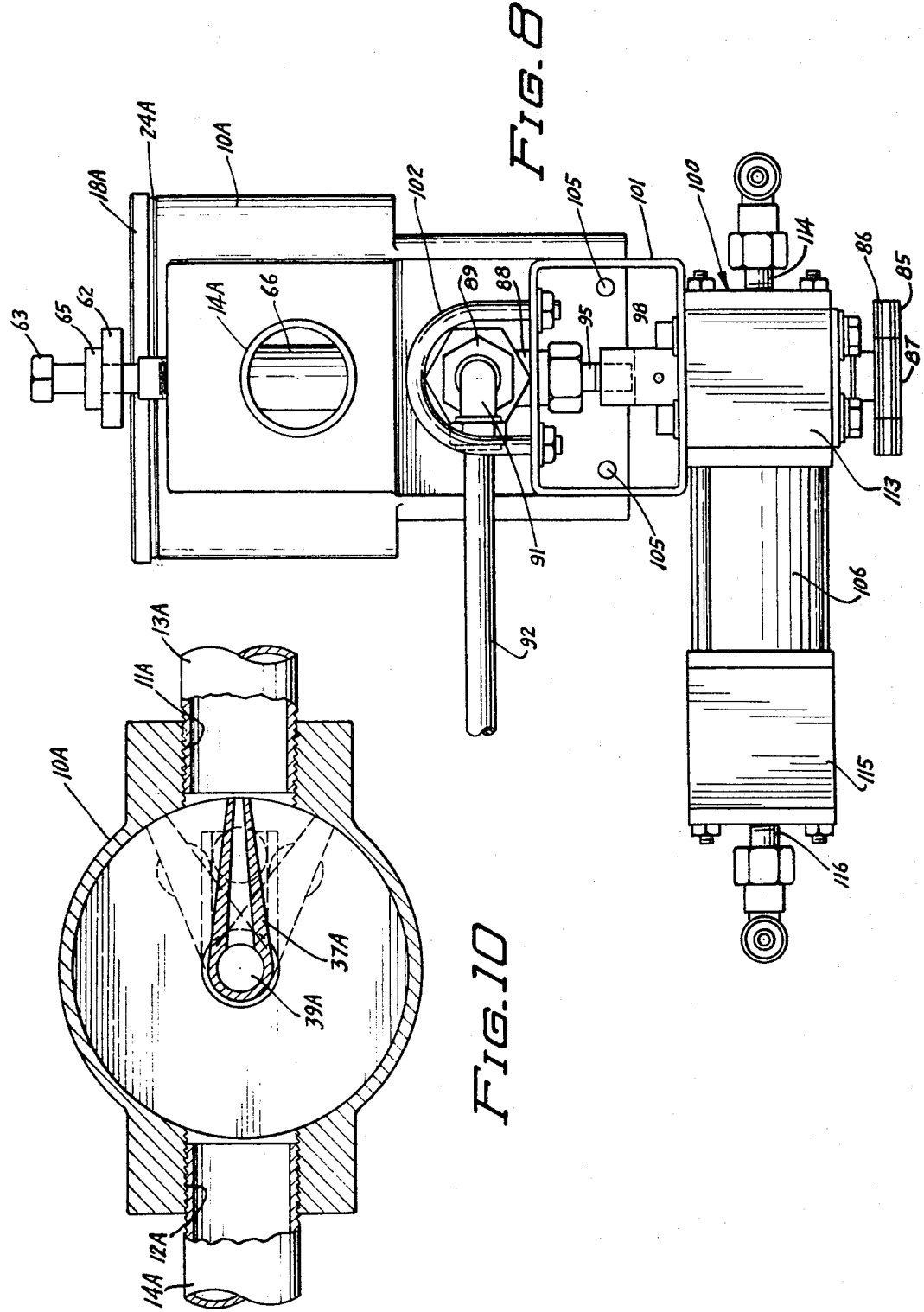

Oct. 28, 1969

E. K. STRAND 3,474,675

LIQUID SAMPLER

Filed Dec. 5, 1966

United States Patent Office 3,474,675
Patented Oct. 28, 1969

3,474,675
LIQUID SAMPLER
Erling K. Strand, deceased, late of Bloomington, Minn., by Edna E. Strand, Executrix, Bloomington, Minn., assignor by mesne assignments, to Hart-Carter Company, Minneapolis, Minn., a corporation of Delaware
Filed Dec. 5, 1966, Ser. No. 600,691
Int. Cl. G01n 1/10
U.S. Cl. 73—422       8 Claims

ABSTRACT OF THE DISCLOSURE

A device for sampling a liquid passing through a flow line. The sampler includes a housing having fittings for connecting it to the flow line. An oscillating diverter is journaled within the housing for rotation by which its mouth is swept across the flow line periodically to divert a portion of that flow line to a sample discharge.

---

This invention relates to a device for dividing out a fractional sample of liquid passing through a flow line in which the device is installed.

The invention is illustrated in the accompanying drawings in which the same numerals are used to identify corresponding parts and in which:

FIGURE 3 is a top plan view of the sampler of FIGURE 1 on a reduced scale, shown partly broken away to reveal interior structure and showing the device connected to an actuator control system;

FIGURE 4 is an enlarged fragmentary section on the line 4—4 of FIGURE 3 and showing means for fastening the sampling device together;

FIGURE 5 is a fragmentary transverse vertical section on the line 5—5 of FIGURE 1 and in the direction of the arrows;

FIGURE 6 is a fragmentary section generally on the line 6—6 of FIGURE 1 and in the direction of the arrows, but showing the diverter in one of the broken line positions;

FIGURE 8 is a left end elevation viewed generally along the line 8—8 of FIGURE 7 and in the direction of the arrows, but shown with the end plate of a fluid actuator support box removed;

FIGURE 10 is a horizontal section on the line 10—10 of FIGURE 7 and in the direction of the arrows;

FIGURE 12 is a fragmentary right end elevation on the line 12—12 of FIGURE 7 showing another portion of the drive for the liquid diverter.

Figure 1:
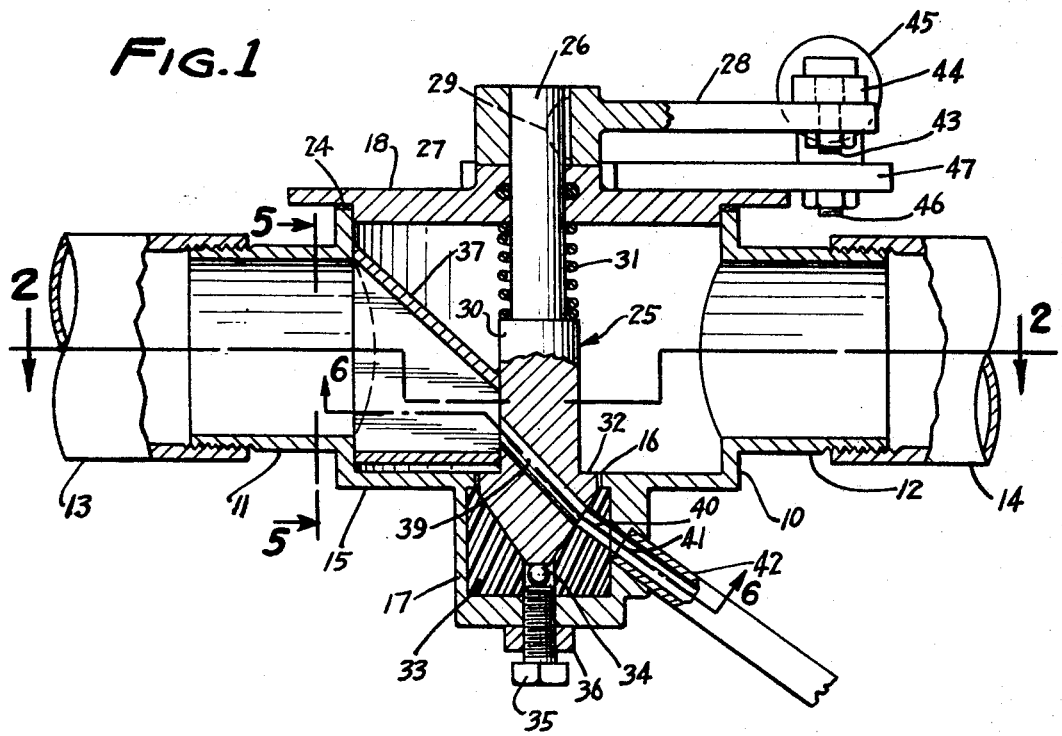
FIGURE 1 is a side elevation in section of one form of the liquid sampler shown installed in a flow line.
Figure 2:
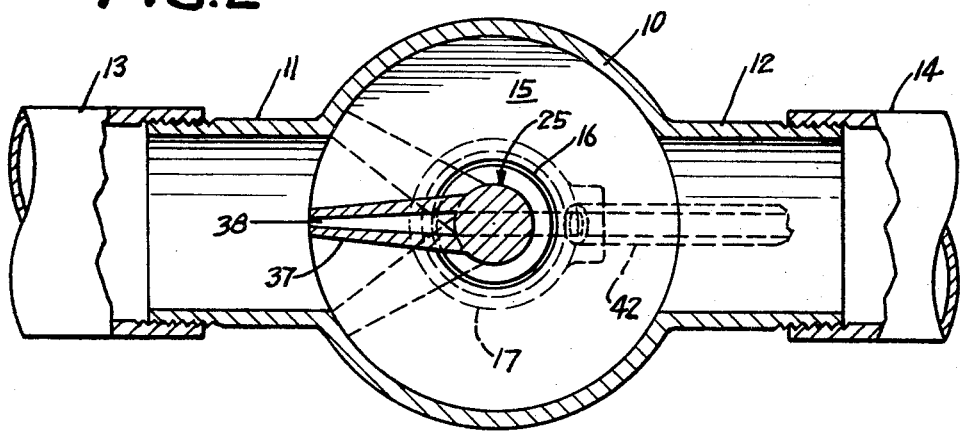
FIGURE 2 is a horizontal section on the line 2—2 of FIGURE 1 and in the direction of the arrows.
Figure 7:
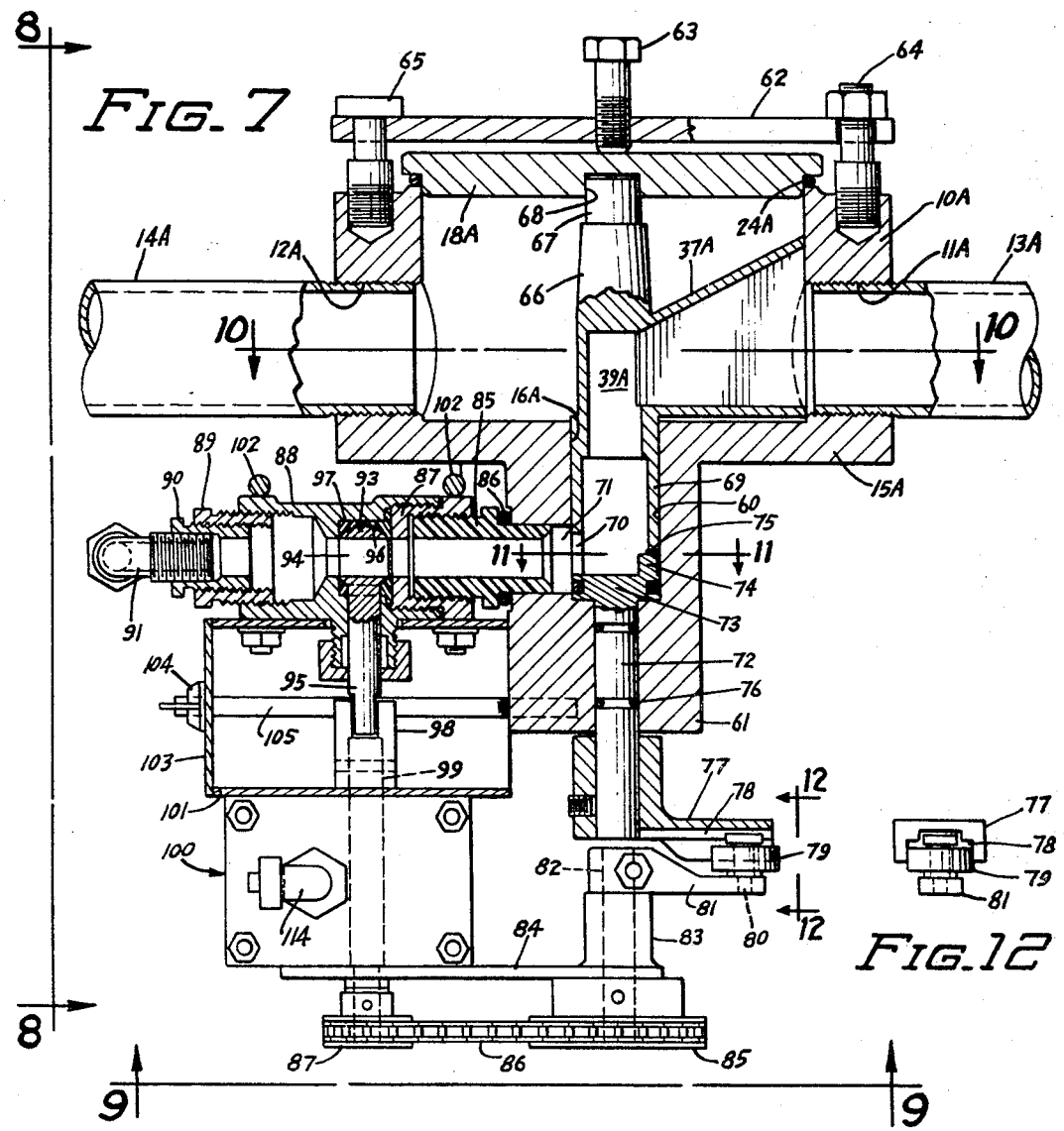
FIGURE 7 is an elevation partly in section of a modified form of liquid sampler according to the present invention shown installed in a liquid flow line.
Figure 11:
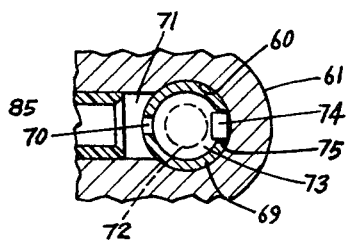
FIGURE 11 is a fragmentary section taken on the line 11—11 of FIGURE 7 and in the direction of the arrows showing a portion of the drive for the sample diverter.
Figure 9:
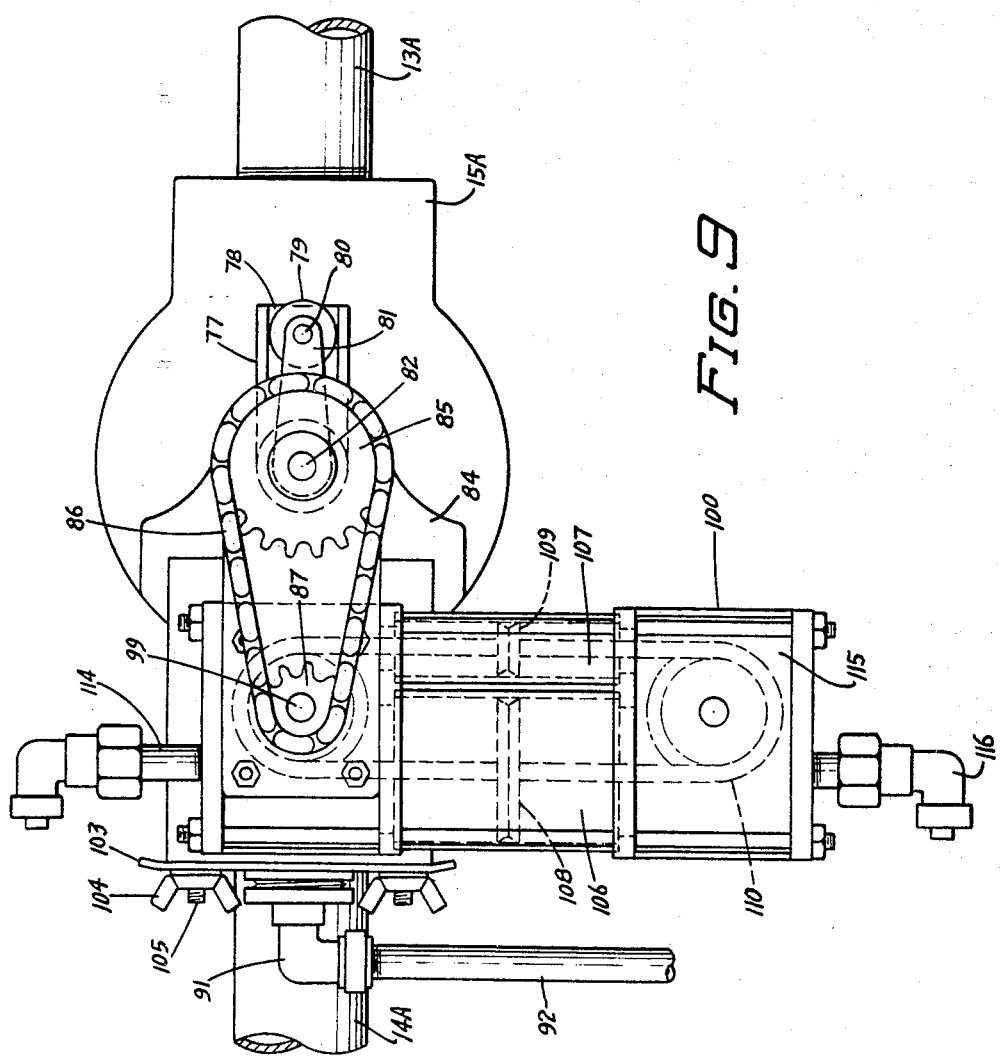
FIGURE 9 is a bottom plan view as seen generally along the line 9—9 of FIGURE 7 and in the direction of the arrows.

Referring now to FIGURES 1 through 6 of the drawings, the liquid sampling device according to one form of the present invention includes a generally cylindrical housing 10 having a threaded inlet fitting 11 and a threaded outlet fitting 12 by which the liquid sampler may be connected into the ends 13 and 14, respectively, of a liquid flow line or pipe line. Fittings 11 and 12 are generally coaxial and intersect the side walls of cylindrical housing 10 substantially perpendicular to the longitudinal axis of that housing. Cylindrical housing 10 is provided with a bottom wall 15 in the center of which is a circular opening 16 communicating with a smaller cylindrical valve seat and bearing housing 17 on the outside bottom of bottom wall 15.

Cylindrical housing 10 is provided with a removable top wall or cover 18. Cover 18 is removable for easy disassembly of the device and is secured, for example, by means of a plurality of toggle bolts 19 spaced uniformly about the periphery of housing 10. Each toggle bolt is pivotally attached at 20 to a projecting lug 21 and provided with a wing nut 22 or equivalent means. The edge of cover 18 is provided with appropriately spaced slots 23 each adapted to receive a toggle bolt 19. A ring gasket 24 insures a liquid-tight fit between cover 18 and housing 10.

A central shaft or stem, indicated generally at 25, extends through housing 10 through cover 18 on one end and into the valve seat and bearing housing 17 on the other. The upper end 26 of stem 25 extends through cover 18. An O-ring 27 or similar sealing means insures a leak-proof fit. That portion of the stem which protrudes beyond cover 18 is fitted with a lever arm 28 keyed at 29 to the stem. The intermediate portion 30 of stem 25 is of slightly greater diameter than top portion 26. The juncture between the two forms a shoulder upon which compression coil spring 31 seats to maintain the stem in spring loaded condition when the cover 18 is secured in place on the housing.

The lowermost end 32 of stem 25 is generally conical in shape and of still larger diameter. This conical tip 32 extends through the opening 16 in the bottom wall 15 of the housing and seats in an annular valving and bearing block 33 whose inner periphery mates with the conical periphery of stem end 32 to form a valve seat. The block 33 is desirably formed from a material, such as nylon, which provides both a fluid tight fit with the metal surfaces of the stem and also functions as a bearing in which the stem is journalled for easy rotary oscillation. The bottom tip of stem 25 is supported on a ball bearing 34. An adjusting screw 35 permits regulation of the sealing engagement between the valve stem and valve seat under tension by coil spring 31. A locking nut 36 permits retention of the proper adjustment.

A relatively narrow hollow scoop-like diverter or collector 37 projects from one side of the intermediate portion 30 of a stem 25. The diverter or collector member 37 extends from the stem to the cylindrical inside wall of housing 10. The narrow vertical slot-like mouth 38 of collector 37 is generally parallel to the axis of stem 25. It extends the full width of inlet fitting 11 and flares slightly toward the stem in its horizontal extent and away from the stem in its vertical extent.

A passage 39 extends through the lower portions of stem 25 communicating between the inner end of diverter or collector member 37 and passage 40 in the valve seat 33. Passage 40 in turn communicates directly with a passage 41 in the wall of housing 17, which in turn communicates with a sample discharge tube or pipe 42 fitted into the wall of housing 17.

Stem 25 is rotatable about its longitudinal axis to move the diverter member 37 through about a 60° arc in order to sweep the slotted mouth of the diverter past the inlet from fitting 11 to housing 10 in order that the diverter member may intercept the flow of liquid through the inlet and collect a representative and uniform sample of the material flowing through the flow line. As the diverter is moved from an at-rest position to one side of the inlet, passage 39 opens partially into passage 40 and this opening increases with movement of the stem and diverter until the diverter is in midstream, in the position shown in full lines in FIGURE 5. At this point the diverter intercepts the maximum flow in the flow line and there is maximum communication between passages 39 and 40. Then, as the diverter continues its sweep across the inlet, the communication between passages 39 and 40 decreases along with the decrease in flow intercepted by the diverter.

Rotation of stem 25 and sweep of diverter member 37 across the inlet is accomplished as follows. Arm 28 is keyed to the upper end 26 of stem 25. The opposite end of arm 28 is pivotally connected at 43 to the end of a piston arm 44 extending from fluid cylinder 45, which in turn is pivotally connected at 46 to a stationary arm 47 secured to the top 18 of housing 10. Fluid cylinder 45 is preferably an air cylinder and is connected through lines 48 and 49 to a solenoid valve 50 which controls flow from a supply line 51 connected to a source of fluid under pressure. Solenoid valve 50 is preferably actuated by a timer controlled solenoid 52. Fluid under pressure introduced into one end of cylinder 45 causes the piston arm 44 to be extended to move arm 28 to rotate stem 25 and diverter 37 to the position shown in broken lines in FIGURE 3. Then, when fluid under pressure is introduced into the opposite end of piston 45, arm 44 is retracted to move arm 28 and diverter 37 to the full line position shown in FIGURE 3.

In operation, the liquid sampler according to the first form of the present invention, as described, is installed in a flow line from which it is desired to withdraw a uniform and representative sample of the material flowing through the line. The fluid cylinder by which oscillation of the sample diverter or collector is actuated is preferably controlled by an electrical or mechanical timer. The duration and frequency of oscillations may be varied widely depending upon the particular requirements of any particular installation. In some instances, it may be desirable to withdraw a sample continuously, and in others the sample may be withdrawn at widely spaced intervals. The device is adaptable to meet all reasonable conditions. Flow through the sampler device is relatively unobstructed. When the diverter or collector 37 is in its at-rest position, its slotted vertical mouth 38 is closed by the inside cylindrical housing wall so that no flow enters into the diverter. At the same time, passage 39 in the stem 25 is out of communication with passage 40 in valve seat 33. When the sampling cycle begins, the collector or diverter 37 sweeps across the inlet opening to the housing 10. Initially, the slotted opening 38 is exposed to the liquid flowing along the extreme side wall of the inlet 11. The area of the opening 38 which is exposed to the stream of liquid flowing through the device increases as the diverter member moves toward the center of the inlet. The area of communication between passages 39 and 40 similarly increases.

As the diverter member passes the center line of the flow line, the exposed area of slot 38 decreases and the area of communication between passages 39 and 40 similarly decreases. The diverted sample flows through tubing 42. It may be collected in appropriate containers for analysis or other testing, as required. The sample collected is of uniformity with and representative of the flow of material through the sampling device. All areas of the flow line are swept by the diverter or collector member. Even though the material in the flow line is stratified or otherwise non-homogeneuos, since all portions of the flow line are intercepted by the diverter, the collected sample will be representative.

Referring now to FIGURES 7 through 13 of the drawings there is shown a modified form of liquid sampler device according to the present invention. To the extent feasible, parts of the modified form of sampler which have a counterpart in the first form of liquid sampler are identified by the same numeral followed by the suffix A. Thus, the modified form of liquid sampling device includes a generally cylindrical housing 10A having a threaded inlet fitting 11A and a threaded outlet fitting 12A by which the liquid sampler may be connected into the ends 13A and 14A respectively of a liquid flow line or pipe line. The ports in fittings or bosses 11A and 12A are generally coaxial and intersect the side walls of cylindrical housing 10A substantially perpendicular to the longitudinal axis of that housing. Cylindrical housing 10A is provided with a bottom wall 15A in the center of which is a circular opening 16A. Opening 16A communicates with a channel 60 extending through a shaft housing 61 disposed outside of the bottom wall 15A.

Cylindrical housing 10A is provided with a movable top wall or cover 18A. Cover 18A is removable for easy disassembly of the sampler and is secured, for example, by a locking bar 62 extending diametrically across the top of cover 18A. An adjusting screw 63 carried by the locking bar 62 permits the cover 18A to be forced into tight sealing engagement with the top opening of housing 10A. A ring gasket 24A insures a liquid-tight fit between the cover and housing. Locking bar 62 is pivotally secured at one end by bolt 64 to permit the locking bar to be swung away from the top opening of housing 10A to permit removal and replacement of cover 18A. The opposite end of locking bar 62 engages bolt 65 when in closed position.

A central shaft or stem 66 extends axially through housing 10A. The upper end 67 of stem 66 is disposed in a recess 68 in the bottom surface of cover 18A. The lower end 69 of stem 66 is hollow and tubular and fits with a tight slide fit in channel 60 of housing 61.

A relatively narrow hollow scoop-like diverter or collector 37A projects from one side of stem 66 and extends to the cylindrical inside wall of housing 10A. The narrow vertical slot-like mouth of collector 37A is generally parallel to the axis of stem 66. It extends the full width of inlet 11A and flares slightly toward the stem in its horizontal extent and away from the stem in its vertical extent.

A passage 39A extends through the lower portion of stem 66 communicating between the inner end of diverter 37A and an outlet passage 70 in the bottom end of the lower tubular section 69 of stem 66. Passage 70 in turn communicates with a sample discharge passage 71 through the side wall of housing 61.

Stem 66 is rotatable about its longitudinal axis to move the diverter member 37A through an arc sweeping the slotted mouth of the diverter past the inlet from flow line 13A to intercept the flow of liquid through the inlet and collect a representative and uniform sample of the material flowing through the flow line. As explained in detail hereinafter, the discharge through passages 70 and 71 is controlled so as to be proportional to the flow into the diverter as it intercepts the flow line.

Rotation of stem 66 and sweep of diverter 37A across the inlet is accomplished as follows. A drive shaft 72 is disposed in the shaft housing 61 coaxial with stem 66. The enlarged upper end 73 of drive shaft 72 is disposed in channel 60. An upstanding projection or lug 74 on the enlarged upper end 73 of drive shaft 72 engages a slot 75 in the bottom end of the lower portion 69 of stem 76 so that, as drive shaft 72 is rotated, stem 66 is similarly rotated. Drive shaft 72 is provided with O-rings 76 which seal the opening in the drive shaft housing 61.

A crank arm 77 is affixed to the lower end of drive shaft 72 which extends beyond the shaft housing 61. Crank arm 77 is provided with a longitudinal channel 78 on its lower surface. A rotary cam follower 79 journalled on shaft 80 carried by crank arm 81 is fitted in channel 78. Crank arm 81 is affixed to a shaft 82 carried in a shaft housing 83 supported from a plate 84. A drive sprocket 85 driven by chain 86 from drive sprocket 87 causes rotation of shaft 82 and crank arm 81. As cam follower 79 partially revolves with partial rotation of crank arm 81, it rotates on shaft 80 and slides relative to crank arm 77 in channel 78 so as to cause partial rotation or oscillation of drive shaft 72 and stem 66 to sweep diverter 37A across the liquid inlet.

The liquid being sampled passes through the tubular lower section 69 of stem 66, out through slot 70 and port 71 into a tubular fitting 85 secured in the discharge port 71 which is sealed by O-ring 86. An internally and externally threaded adapter sleeve 87 fits over fitting 85 and within valve body 88 to connect the two. A pair of threaded adapters 89 and 90 connect the opposite side of valve body 88 to a fitting 91 connecting to a liquid sample discharge tube 92.

A ball valving member 93 having a longitudinal passage 94 and secured to a stem 95 is seated in a generally spherical cavity formed between two mating generally hemispherical cavities in a pair of annular members 96 and 97. This valve seat is desirably made from a long wearing and slightly resilient material, such as nylon. Members 96 and 97 are held in tight engagement with ball valve element 93 by means of one end of adapter sleeve 87 slightly compressing them. Upon rotation of stem 95 ball valve 93 is rotated within the valve seat members 96 and 97 to close off passage 94 and to vary the rate of flow of liquid sample diverted from the main flow stream.

The end of valve stem 95 is engaged for rotation by a slotted collar 98 secured to one end of the output shaft 99 of a fluid actuator, indicated generally at 100. The actuator is suspended from a support box 101, which in turn is suspended from valve 88 by means of a pair of U-bolts 102. Support box 101 is enclosed by an end plate 103 secured by wing nuts 104 threaded on the ends of bolts 105, the opposite ends of which are threaded into shaft housing 61. Actuator 100 is a commercial unit of the type sold under the trademark "Rota-Cyl" by Graham Engineering Company, Inc., of Palo Alto, Calif.

Figure 13:
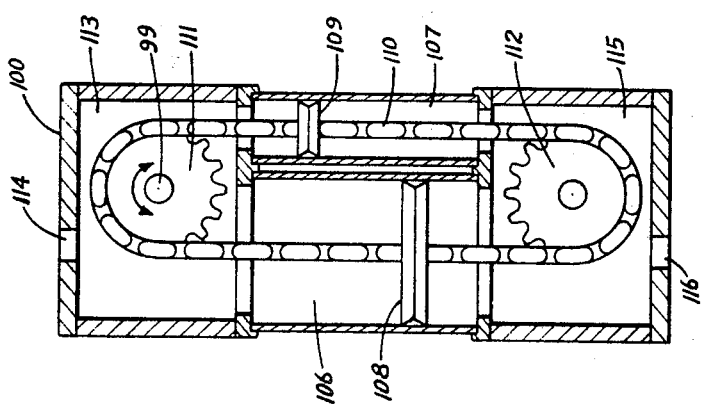
FIGURE 13 is a horizontal section through the actuator unit for the modified form of liquid sampler.

As best seen by reference to FIGURE 13, the actuator uses two cylinders in parallel, the primary cylinder 106 is the power cylinder and the secondary cylinder 107 is the chain return or seal cylinder. Primary piston 108 and secondary piston 109 are suspended in series on an endless chain 110 which passes over sprocket 111 on output shaft 99 and over an automatically tensioned idler 112. Fluid pressure is applied to either the drive head 113 through a fluid supply port or fitting 114 or to the idler head 115 through a fluid supply port or fitting 116. The opposite head is vented to the atmosphere or drain depending upon use of a gaseous or hydraulic pressure fluid. The larger primary piston 108 moves away from the pressure due to the differential pressure on the two pistons and pulls chain 110 causing sprocket 111 and output shaft 99 to turn, thus directly converting pneumatic or hydraulic energy into rotary power.

Drive sprocket 87 is attached to the opposite end of actuator output shaft 99 for rotation therewith. Thus, diverter 37A is swept across the liquid flow inlet from flow line 13A simultaneously with rotation of ball valve 93 in its valve seat. At the time diverter 37A is in position to intercept the maximum flow from the flow line the valve is open to its maximum extent to pass fluid to the sample discharge line 92. As the diverter moves across the areas of lesser flow, valve 93 is likewise rotated to reduce the rate of flow therethrough. When diverter 37A is in one of the broken line positions shown in FIGURE 10, out of the path of the flow line, valve 93 is then closed.

Fluid pressure is introduced into the actuator alternately through supply inlets 114 and 116 either continuously or in any predetermined timed sequence. In each half cycle of operation the diverter sweeps across the liquid flow line from one side to the other and diverts a truly representative and proportional sample of the liquid flow line out through valve 93 to the sample discharge line 92.

I claim:

1. A sampling device for diverting a representative sample of liquid flowing through a flow line from that flow line, said device comprising a cylindrical housing having fittings for connecting it into a liquid flow line, said fittings being generally coaxial and disposed on a common axis on opposite sides of said housing, discharge means from said housing for the diverted flow, oscillating diverter means including a stem centrally disposed and journaled for rotation in said cylindrical housing and coaxial therewith, said diverter means having a slot-like mouth and being adapted for periodic oscillation with said mouth immediately adjacent the inside cylindrical wall of said housing to move its mouth from a first position out of the path of the liquid flow line sweeping across said flow line to another position out of the path of the flow line, said diverter means being in direct fluid communication with said discharge means through a passage through said stem when the mouth of the diverter means is in the path of the liquid flow line, and means for periodically oscillating said diverter means.

2. A sampling device according to claim 1 further characterized in that the mouth of said diverter means is of a length at least equal to the diameter of the liquid flow line to be sampled and said diverter means is journalled to be oscillated across the entire width of said flow line to insure interception of the whole cross-section of said flow line and obtaining of a representative sample.

3. A sampling device according to claim 1 further characterized in that means are connected to one end of said stem extending through and beyond said housing and drive means are secured thereto for rototion of said stem and oscillation of said diverter.

4. A sampling device according to claim 3 further characterized in that said drive means is connected to and driven by a timer controlled fluid cylinder and piston actuator.

5. A sampling device according to claim 1 further characterized in that said discharge means for the diverted flow includes a rotary valve means intercepting the diverted flow line, said valve means being rotatable with said diverter means to control the rate of flow therethrough proportional to the rate of flow into the diverter means.

6. A sampling device according to claim 5 further characterized in that said diverter means includes a stem journalled for rotation in said housing, said rotary valve means is disposed for rotation on an axis spaced from the parallel to the axis of said stem, parallel drive shafts connected respectively to said stem and said valve means, power means for rotating one of said shafts and means connecting said shafts for rotation together.

7. A sampling device for liquids flowing through a flow line for diverting a representative fraction of the flow from the flow line, said device comprising:
(A) a housing having fittings for connecting it into a liquid flow line,
(B) a central stem in said housing journaled for oscillation therein,
(C) a relatively narrow hollow liquid diverter projecting from said stem for oscillation therewith,
(D) said diverter having a narrow slot mouth aligned generally parallel with the axis of said stem,
(E) a passage through said stem communicating with said diverter,
(F) a sample discharge flow line from said housing and a rotary valve therein,
(G) said stem and said valve means being disposed for rotation on parallel spaced apart axes connected respectively to parallel spaced apart drive shafts, shafts,
(H) a passage through said valve communicating with said passage through said stem when the mouth of said diverter is disposed in the path of said flow line,
(I) said diverter and said valve being rotatable together to close off said passage through said valve when the mouth of said diverter is out of the path of said flow line, (J) drive means for rotating said valve and said stem and oscillating said diverter across said flow line, and (K) said drive means being connected to directly drive one of said shafts and the other shaft being connected thereto for rotation with and proportional to the first shaft.

8. A sampling device according to claim 7 further characterized in that said drive means includes a timer controlled fluid cylinder and piston actuator.

References Cited

UNITED STATES PATENTS

| 2,641,934 | 6/1953 | Werts | 73—422 |
| 3,000,219 | 9/1961 | De Boalt | 73—422 |
| 3,005,347 | 10/1961 | Smithson | 73—423 |

LOUIS R. PRINCE, Primary Examiner

H. C. POST III, Assistant Examiner

U.S. Cl. X.R.

73—423